US012317048B2

(12) United States Patent
Ren et al.

(10) Patent No.: US 12,317,048 B2
(45) Date of Patent: May 27, 2025

(54) SOUNDING DEVICE

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 274 days.

(21) Appl. No.: 18/302,782

(22) Filed: Apr. 18, 2023

(65) Prior Publication Data

US 2024/0073621 A1 Feb. 29, 2024

Related U.S. Application Data

(63) Continuation of application No. PCT/CN2022/120190, filed on Sep. 21, 2022.

(30) Foreign Application Priority Data

Aug. 30, 2022 (CN) ......................... 202222293073.7

(51) Int. Cl.
*H04R 9/02* (2006.01)
*H04R 7/06* (2006.01)

(52) U.S. Cl.
CPC ............... *H04R 9/025* (2013.01); *H04R 7/06* (2013.01)

(58) Field of Classification Search
CPC .......... H04R 7/18; H04R 9/045; H04R 9/046; H04R 7/20; H04R 9/06; H04R 1/06; H04R 9/043; H04R 2400/11; H04R 2307/207; H04R 2499/11; H04R 7/127; H04R 1/24; H04R 1/1016; H04R 9/063; H04R 9/025; H04R 7/06; H04R 7/04; H04R 9/02; H04R 7/26; H04R 7/12; H04R 2209/041
USPC ....... 381/386, 381, 400, 402, 403, 405, 407, 381/409, 410, 411, 412
See application file for complete search history.

(56) References Cited

U.S. PATENT DOCUMENTS

| | | | | |
|---|---|---|---|---|
| 12,120,495 B2 * | 10/2024 | Ren | H04R 9/06 | |
| 12,155,991 B2 * | 11/2024 | Ren | H04R 9/046 | |
| 2002/0168074 A1 * | 11/2002 | Miyamoto | H04R 9/10 | 381/182 |
| 2013/0195293 A1 * | 8/2013 | Ko | H04R 19/02 | 381/191 |
| 2021/0377668 A1 * | 12/2021 | Park | H04R 1/44 | |
| 2023/0292037 A1 * | 9/2023 | Xu | H04R 1/24 | |

FOREIGN PATENT DOCUMENTS

CN 201781608 U * 3/2011

* cited by examiner

*Primary Examiner* — Carolyn R Edwards
*Assistant Examiner* — Julie X Dang
(74) *Attorney, Agent, or Firm* — Wiersch Law Group

(57) ABSTRACT

The present invention provides a sounding device. The sounding device includes a frame, a first vibration system having a first diaphragm and a first voice coil, a second vibration system, a magnetic circuit system with a first magnetic gap and a second magnetic gap, and an inner sounding cavity, a support ring, and an insertion member. Airflow generated by the vibration of the first diaphragm pushes the second diaphragm through the support ring. Compared with the related art, the sounding device of the present invention is convenient to improve the low frequency performance and has a better user experience effect.

10 Claims, 3 Drawing Sheets

SOUNDING DEVICE

TECHNICAL FIELD

The present invention relates to the field of electro-acoustic transducers, in particular to a sounding device used in a portable electronic product.

BACKGROUND ART

As one of the main components of mobile terminals such as mobile phones, the sounding device is mainly used to convert electrical signals into sound signals.

The sounding device of the related art includes a frame, a vibration system fixed on the frame, and a magnetic circuit system with the magnetic gap. The vibration system includes a diaphragm fixed to the frame for vibrating sound, and a voice coil inserted in the magnetic gap to drive the diaphragm to vibrate.

One diaphragm is set for vibrating and sounding, and a single diaphragm uses a single voice coil structure. In small the cavity body applications, the traditional single voice coil structure needs high power drive to improve low frequency, which is difficult to achieve due to the high voltage PA and the high risk of the voice coil temperature. The power of the voice coil driver is concentrated, resulting in the risk of PA voltage output limitation and excessive temperature of the voice coil, which cannot improve the low frequency performance, and the user experience effect is not good.

Therefore, it is necessary to provide a new the sounding device to solve the above technical problems.

SUMMARY OF THE INVENTION

The main purpose of the present invention is to provide a sounding device with good working safety of the voice coil, which is easy to improve the low-frequency performance and better user experience.

For achieving the object mentioned above, the present invention provides a sounding device, comprising a frame; a magnetic circuit system fixed on the frame, having a first magnetic gap close to the first vibration system and a second magnetic gap surrounded by the first magnetic gap; a first vibration system having a first diaphragm fixed on the frame, and a first voice coil inserted in the first magnetic gap for driving the first diaphragm; a cover body fixed on the first diaphragm; an inner sounding cavity cooperatively formed by the frame, the first vibration system, the magnetic circuit system and the cover body; a second vibration system located in the inner sounding cavity, including a second diaphragm located in a side of the magnetic circuit system close to the first diaphragm, and a second voice coil inserted in the second magnetic gap for driving the second diaphragm to vibrate; an insertion member located below the second diaphragm, having a pressure relief hole therethrough such that an airflow generated by the vibration of the second diaphragm is transmitted from the pressure relief hole to an outside; and a support ring in the inner sounding cavity for being fixed to the first diaphragm, the second diaphragm and the magnetic circuit system. The support ring includes a support ring body and a through hole through the support ring body for communicating with the inner sounding cavity; an outer peripheral side of the second diaphragm is fixed in the through hole, and the airflow generated by the vibration of the first diaphragm pushes the second diaphragm through the through hole of the support ring.

In addition, the through hole includes a first through hole formed relatively through one side of the support ring body and a second through hole formed on the other side of the support ring body.

In addition, the magnetic circuit system includes a yoke fixed on the frame, an extension part protruding from the yoke towards the second vibration system, a first auxiliary magnet fixed to the yoke for forming the second magnetic gap around the extension part, and a second auxiliary magnet fixed to the yoke and surrounding the first auxiliary magnet and spaced from the first auxiliary magnet for forming the first magnetic gap; and an outer periphery of the second diaphragm is supported by the support ring.

In addition, the first diaphragm comprises a first suspension, a second suspension disposed at an inner side of the first suspension, a ring-shaped skeleton connecting the first suspension and the second suspension, and a ring-shaped first dome fixed to the skeleton; an outer peripheral side of the first suspension is fixed to the frame, and an inner peripheral side of the second suspension is fixed to a top surface of the support ring; the first voice coil is fixed on a side of the skeleton close to the magnetic circuit system; the cover body presses an inner peripheral side of the second suspension to the support ring, and the cover body and the second diaphragm are spaced apart in a vibration direction of the second diaphragm; another end of the skeleton is connected with the first voice coil for suspending the first voice coil in the first magnetic gap.

In addition, the first vibration system further includes an auxiliary diaphragm fixed to the frame and the skeleton.

In addition, the second diaphragm includes a second vibration part spaced from the extension part in the vibration direction, a third suspension extending outward from the periphery of the second vibration part, and a fixed part extending from the outer peripheral side of the third suspension and fixed to the support ring; the second voice coil is fixed on the side of the second vibration part close to the magnetic circuit system.

In addition, the magnetic circuit system further includes a first pole plate fixed on a side of the first auxiliary magnet close to the first vibration system, and a second pole plate fixed to a side of the second auxiliary magnet close to the first vibration system.

In addition, the magnetic circuit system further comprises a mounting hole penetrating the extension part and the yoke along the vibration direction of the second diaphragm.

In addition, the insertion member includes an insertion member body accommodated in the mounting hole, a support wall of the insertion member that is bent and extended outward by the top end of the insertion member body, and a conductive terminal extending from the bottom end of the insertion member body to outside the inner sounding cavity; the support wall of the insertion member is fixed to a top part of the extension part, the first voice coil and the second voice coil are respectively electrically connected to the insertion member body.

In addition, the sounding device includes a leak hole formed between the frame and the yoke, and a housing fixed on the outer peripheral side of the yoke, wherein the housing engages with the frame.

Compared with the related art, in the sounding device of the present invention, the push-pull structure of the outer and inner dual vibration systems vibrating in the same direction is realized through the magnetic circuit system to improve the low frequency response. The magnetic circuit system is fixed on the frame, one side of the magnetic circuit system close to the first vibration system is provided with a first magnetic gap and a second magnetic gap, the first magnetic gap is arranged around the second magnetic gap. The first voice coil is inserted in the first magnetic gap. The frame, the first vibration system, the magnetic circuit system and the cover body together form an inner sounding cavity. The second vibration system is set in the inner sounding cavity, the second vibration system consists of a second diaphragm fixedly supported on the side of the magnetic circuit system near the first diaphragm, and a second voice coil that drives the second diaphragm to vibrate. The second voice coil is inserted in the second magnetic gap. The support ring is set between the first vibration system and the second vibration system, the support ring includes a support ring body and a through hole for penetrating the support ring body, the through hole is connected to the inner sounding cavity, the outer peripheral side of the second diaphragm is fixed in the through hole. The airflow created by the vibration of the first diaphragm passes through the through hole in the support ring and pushes the second diaphragm. The insertion member is located below the second diaphragm, the insertion member is provided with a pressure relief hole therethrough, the air flow generated by the vibration of the second diaphragm is transmitted from the pressure relief hole to the outside world. In this way, the dual voice coil drive of the push-pull structure can distribute the power, which solves the limitation of the PA voltage output and the risk of excessive temperature of the voice coil, improves the low frequency performance, and has a good user experience.

DETAILED DESCRIPTION OF EXEMPLARY EMBODIMENT

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
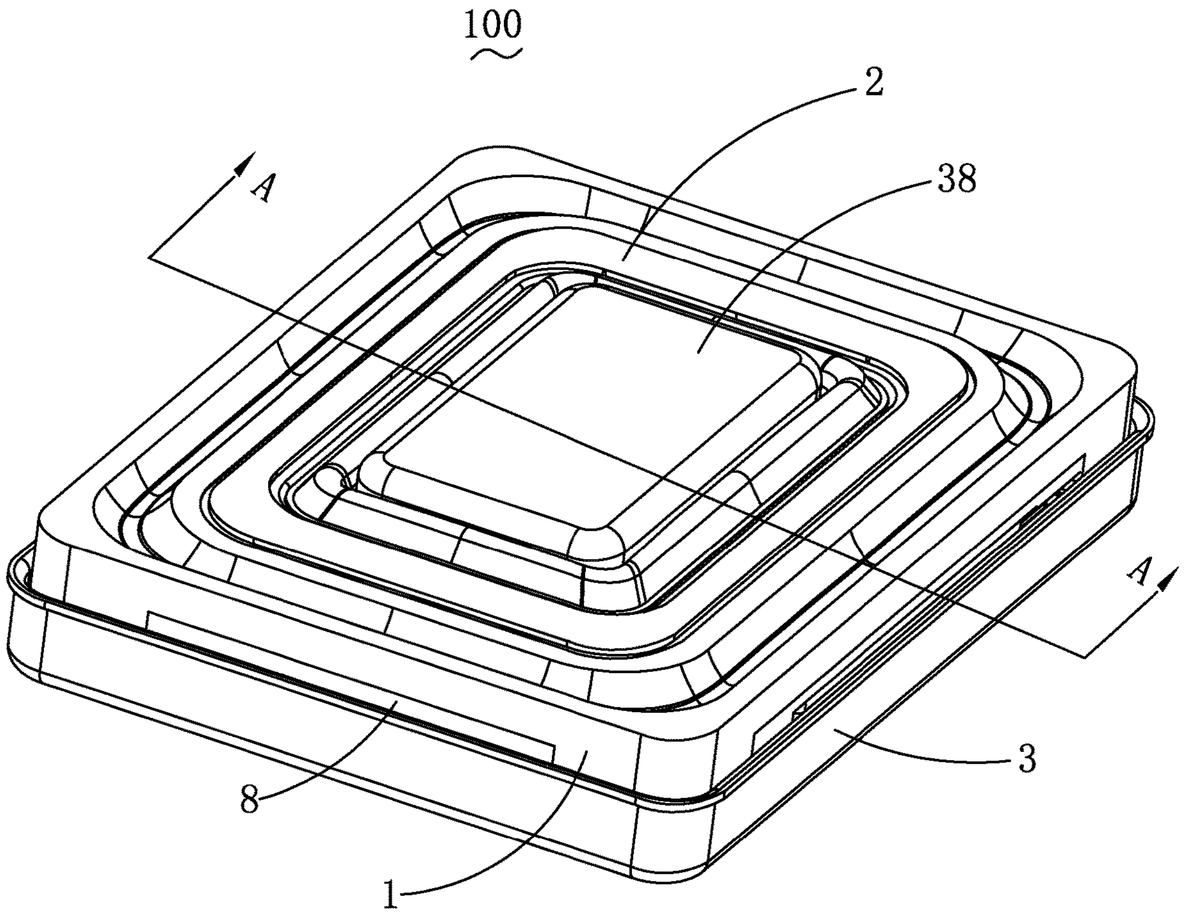
FIG. 1 is an isometric view of a sounding device in accordance with an exemplary embodiment of the present invention.
Figure 2:
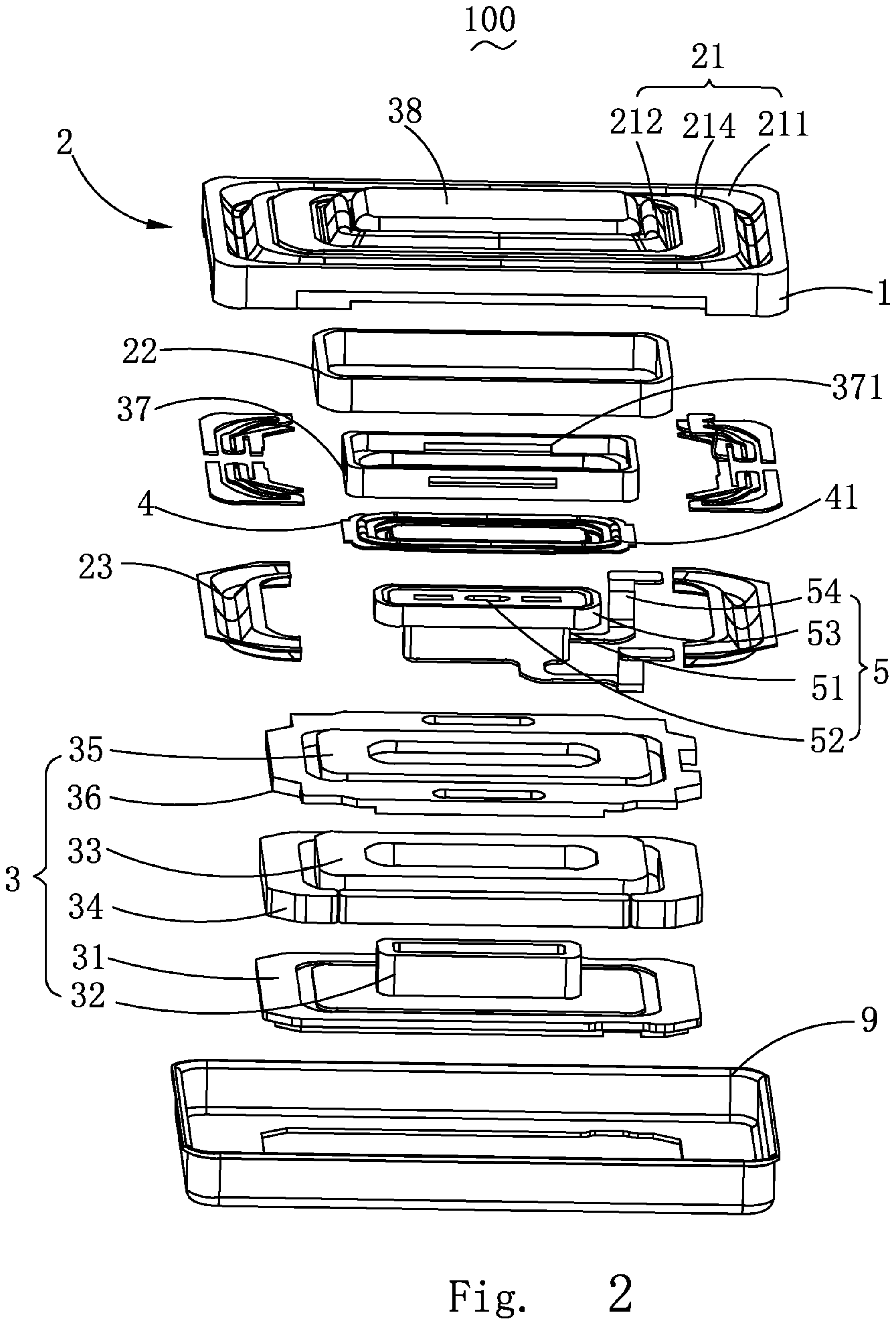
FIG. 2 is an isometric and exploded view of the sounding device in FIG. 1.
Figure 3:
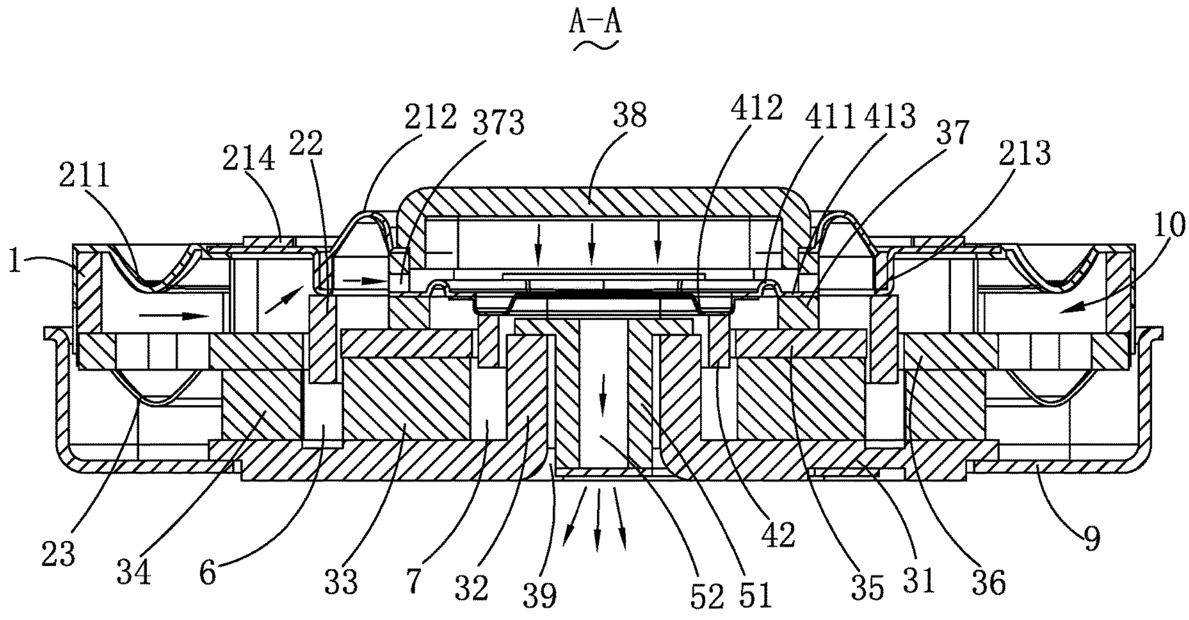
FIG. 3 is a cross-sectional view of the sounding device taken along line A-A in FIG. 1.
Figure 4:
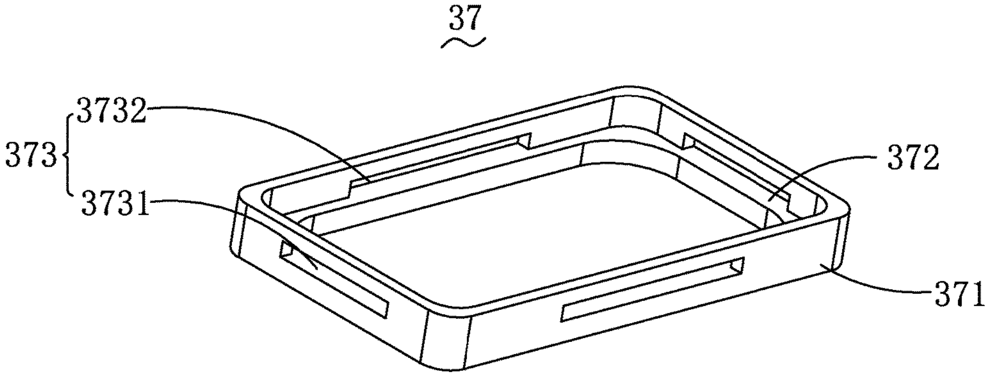
FIG. 4 illustrates a support ring of the sounding device of the embodiment.

Referring to FIGS. 1-4, an embodiment of the present invention provides a sounding device 100, including a frame 1, a first vibration system 2, a magnetic circuit system 3, a second vibration system 4, an insertion member 5 and a cover body 38.

The frame 1 is used to support and fix the first vibration system 2, the second vibration system 4, the magnetic circuit system 3 and the insertion member 5.

The first vibration system 2 includes a first diaphragm 21 fixed to the frame 1, and a first voice coil 22 that drives the first diaphragm 21 to vibrate and sound.

The magnetic circuit system 3 is fixed on the frame 1, a first magnetic gap 6 and a second magnetic gap 7 are arranged at intervals on one side of the magnetic circuit system 3 close to the first vibration system 2. The first magnetic gap 6 is arranged around the second magnetic gap 7; the first voice coil 22 is inserted into the first magnetic gap 6.

The cover body 38 is fixed on the first diaphragm 21, the frame 1, the first vibration system 2, the magnetic circuit system 3 and the cover body 38 together form an inner sounding cavity 10. Optionally, the cover body 38 is provided on the inner peripheral side of the first diaphragm 21.

The second vibration system 4 is located in the inner sounding cavity 10, the second vibration system 4 includes a second diaphragm 41 supported on the magnetic circuit system 3 on the side close to the first diaphragm 21, and a second voice coil 42 that drives the second diaphragm 41 to vibrate and sound. The second voice coil 42 is inserted into the second magnetic gap 7. The vibration directions of the first vibration system 2 and the second vibration system 4 are the same. The vibration amplitude of the first diaphragm 21 of the first vibration system 2 is larger than the vibration amplitude of the second diaphragm 41 of the second vibration system 4. The cross-sectional area of the first voice coil 22 is larger than the cross-sectional area of the second voice coil 42. In this way, the driving force of the first voice coil 22 is greater than the driving force of the second voice coil 42, forming a dual-direction driving structure of the voice coils, in this way, the dual voice coil drive of the push-pull structure can distribute the power.

A support ring 37 is included. The support ring 37 is located in the inner sounding cavity 10, and is fixed to the first diaphragm 21, the second diaphragm 41 and the magnetic circuit system 2, respectively. The support ring 37 includes a support ring body 371 and a through hole 373 penetrating the support ring body 371. The through hole 373 is connected to the inner sounding cavity 10. The outer peripheral side of the second diaphragm 41 is fixed in the through hole 373. The air flow generated by the vibration of the first diaphragm 21 passes through the through hole 373 of the support ring 37 and then pushes the second diaphragm 41, the insertion member 5 is located below the second diaphragm 21, the insertion member 5 is provided with a pressure relief hole 52 therethrough. The air flow generated by the vibration of the second diaphragm 41 is transmitted from the pressure relief hole 52 to the outside. This facilitates the transfer of the air in the inner sounding cavity 10 from the first magnetic gap 6, the through hole 373 in turn, into the cavity body between the cover body 38 and the first diaphragm 21. The cover body 38 covering the first diaphragm 21 blocks pushing the second diaphragm 41 in the opposite direction of its vibration direction, which allows the air flow generated by the vibration of the second diaphragm 41 to be transmitted from the pressure relief hole 52 to the outside. In this way, the dual voice coil drive of the push-pull structure can distribute the power, which solves the limitation of the PA voltage output and the risk of excessive temperature of the voice coil, improves the low frequency performance, and has a good user experience.

In this embodiment, the support ring 37 further includes a protruding platform 372 protruding and extending from the support ring body 371 to the direction close to the second diaphragm 41. The outer peripheral side support of the second diaphragm 41 is fixed to the protruding platform 272. The outer peripheral side of the second diaphragm 41 is placed on the protruding platform 272 and fixed to the through hole 37, so that the second diaphragm 41 has a good fixing effect.

In this embodiment, the through hole 373 includes a first through hole 3731 formed on one side of the support ring body 371, and a second through hole 3732 formed on the other side of the support ring body 371. Specifically, the first through holes 3731 include two, and the second through holes 3732 include two. The support ring body 371 is a rectangular structure, and two of first through holes 3731 are arranged at intervals on its opposite short sides, respectively, two of second through holes 3732 are arranged at intervals on its opposite long sides, respectively.

The two the first through hole 3731 and the two second through hole 3732 are connected with the inner sounding cavity 100, with this arrangement, the air in the inner sounding cavity flows through the first through hole 3731 and the second through hole 3732 to between the cover body 38 and the second diaphragm 41, thereby realizing a push-pull structure with dual vibrations in the same direction. The power can be dispersed, which solves the limitation of the PA voltage output and the risk of excessive temperature of the voice coil, and at the same time, the low frequency performance is improved, and the user experience effect is good.

In this embodiment, the magnetic circuit system 3 includes a yoke 31, and an extension part 32 which protrudes from the yoke 31 to the second vibration system 4 in the opposite direction, and a first auxiliary magnet 33 which is fixed to the yoke 31 and forms the second magnetic gap 7 around the extension part 32, and a second auxiliary magnet 34 which is fixed to the yoke 31 and surrounds the first auxiliary magnet 33 and is spaced from the first auxiliary magnet 33 to form the first magnetic gap 6. The outer perimeter support of the second diaphragm 41 is supported and fixed to the support ring 37. The magnetic fields generated between the extension part 32 and the first auxiliary magnet 33 and the second auxiliary magnet 34 act on the second voice coil 42 and the first voice coil 22 respectively, which increases the sound producing performance of the voice coil.

In this embodiment, the first diaphragm 21 includes a first suspension 211 fixed on the frame 1 and in the shape of a ring, and a second suspension 212, which is arranged in the inner side of the first suspension 211 and is annular at intervals, and a skeleton 213 connecting the first suspension 211 and the second suspension 212, and a first dome 214 fixed to the skeleton 213 in a ring shape. The outer peripheral side of the first suspension 211 is fixed to the frame 1, the inner peripheral side of the second suspension 212 is fixed to the top surface of the support ring 37. The first voice coil 22 is fixed to the side of the skeleton 213 close to the magnetic circuit system 3. The cover body 38 presses the inner peripheral side of the second suspension 212 to the support ring 37, and the direction of vibration of the cover body 38 and the second diaphragm 41 along the second diaphragm 41 is opposite and spaced The first suspension 211 is fixed on the frame 1. The second suspension 212, the skeleton 213 and the first suspension 211 are fixedly connected, thereby improving the vibration performance of the first diaphragm 21. The other end of the skeleton 213 is connected to the first voice coil 22 to suspend the first voice coil 22 in the first magnetic gap 6. The fixing effect of the skeleton 213 and the first voice coil 22 is increased through the skeleton 213 to stabilize the vibration process and prevent the first voice coil 22 from falling off.

In this embodiment, the first vibration system 2 further includes an auxiliary diaphragm 23 of the frame 1. The auxiliary diaphragm 23 is connected to the skeleton 213. The auxiliary diaphragm 23 is provided at both ends of the frame 1 for cooperating with the first diaphragm 21, which enhances the vibration performance of the first diaphragm 21.

In this embodiment, the second diaphragm 41 includes a second vibration part 412 spaced from the extension part 32 along its vibration direction, and a third suspension 411, a third suspension 411 that extends outward from the periphery of the second vibration part 412, and a fixed part 413 extending from the outer peripheral side of the third suspension 411 and fixed to the support ring 37. The second voice coil 42 is fixed to the side of the second vibration part 412 close to the magnetic circuit system 3. The second diaphragm 41 is set directly opposite the cover body 38, in this way, the dual voice coil drive of the push-pull structure can distribute the power, solving the PA voltage output limitation and the risk of the voice coil overheating, and at the same time the low frequency performance is improved.

In this embodiment, the magnetic circuit system 3 further includes a first pole plate 35 which is fixed on the side of the first auxiliary magnet 33 close to the first vibration system 2, and a second pole plate 36 fixed to the side of the second auxiliary magnet 34 close to the first vibration system 2. The magnetic properties of the first auxiliary magnet 33 and the second auxiliary magnet 34 are increased by the first pole plate 35 and the second pole plate 36, respectively. The support ring body 371 is supported on the first pole plate 35.

In this embodiment, the magnetic circuit system 3 further includes a mounting hole 39 penetrated by the extension part 32 and the yoke 31 along the vibration direction of the second diaphragm 41, the sounding device 100 also includes an insertion member 5 assembled in the mounting hole 39, the insertion member 5 is electrically connected to the first voice coil 22 for providing a driving signal to the first voice coil 22. The insertion member 5 is mounted through the mounting hole 39, and the fixing effect is good. Optionally, the insertion member 5 is arranged between the first diaphragm 21 and the auxiliary diaphragm 23.

Preferably, the extension part 32 extends from the yoke 31 to the second vibration system 4 to form an annular protrusion (not shown), the middle of the annular protrusion is penetrated to form the mounting hole 39, the mounting hole 39 is used to place the insertion member 5. Optionally, it is not necessary to use the mounting hole 39 to lead out the conduction, that is, the extension part 32 can also be solid, with strong magnetic ability.

In this embodiment, the insertion member 5 includes an insertion member body 51 accommodated in the mounting hole 39, and a support wall of the insertion member 53 which is bent and extended outward by the top end of the insertion member body 51, and a conductive terminal 54 extending from the bottom end of the insertion member body 51 to the outside of the inner sounding cavity 10. The support wall of the insertion member 53 is supported and fixed on the top of the extension part 32, the support wall of the insertion member 53 and the extension part 32 are well fixed, so that the insertion member body 51 is stably installed in the extension part 32. The first voice coil 22 and the second voice coil 42 are electrically connected to the insertion member body 51, respectively. In this way, it is convenient to provide electric drive for the first voice coil 22 and the second voice coil 42 respectively. Preferably, the pressure relief hole 52 is formed by penetration the insertion member body 51, and the pressure relief effect is good.

In the present embodiment, a leak hole 8 is formed between the frame 1 and the yoke 31, the sounding device 100 also includes a housing 9 fixed on the outer peripheral side of the yoke 31, the housing 9 is extended to be fixed on the frame 1. This setting is convenient for the sounding device to release pressure, and the acoustic performance is better.

Compared with the related art, in the sounding device of the present invention, the push-pull structure of the outer and inner dual vibration systems vibrating in the same direction is realized through the magnetic circuit system to improve the low frequency response. The magnetic circuit system is fixed on the frame, one side of the magnetic circuit system close to the first vibration system is provided with a first magnetic gap and a second magnetic gap, the first magnetic gap is arranged around the second magnetic gap. The first voice coil is inserted in the first magnetic gap. The frame, the first vibration system, the magnetic circuit system and the cover body together form an inner sounding cavity. The second vibration system is located in the inner sounding cavity, the second vibration system includes a second diaphragm fixedly supported on the side of the magnetic circuit system close to the first diaphragm, and a second voice coil that drives the second diaphragm to vibrate, the second voice coil is inserted in the second magnetic gap. A support ring is set between the first vibration system and the second vibration system, the support ring includes a support ring body and a through hole penetrated by the support ring body. The through hole is connected to the inner sounding cavity.

The outer peripheral side of the second diaphragm is fixed in the through hole. The airflow created by the vibration of the first diaphragm passes through the through hole in the support ring and pushes the second diaphragm. The insertion member is located below the second diaphragm, the insertion member is provided with the pressure relief hole therethrough, the air flow generated by the vibration of the second diaphragm is transmitted from the pressure relief hole to the outside world. In this way, the dual voice coil drive of the push-pull structure can distribute the power, which solves the limitation of the PA voltage output and the risk of excessive temperature of the voice coil, improves the low frequency performance, and has a good user experience.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding device, including:

a frame;

a magnetic circuit system fixed on the frame, having a first magnetic gap close to a first vibration system and a second magnetic gap surrounded by the first magnetic gap;

the first vibration system having a first diaphragm fixed on the frame, and a first voice coil inserted in the first magnetic gap for driving the first diaphragm;

a cover body fixed on the first diaphragm;

an inner sounding cavity cooperatively formed by the frame, the first vibration system, the magnetic circuit system and the cover body;

a second vibration system located in the inner sounding cavity, including a second diaphragm located in a side of the magnetic circuit system close to the first diaphragm, and a second voice coil inserted in the second magnetic gap for driving the second diaphragm to vibrate;

an insertion member located below the second diaphragm, having a pressure relief hole therethrough such that an airflow generated by the vibration of the second diaphragm is transmitted from the pressure relief hole to an outside; and a support ring in the inner sounding cavity for being fixed to the first diaphragm, the second diaphragm and the magnetic circuit system; wherein the support ring includes a support ring body and a through hole through the support ring body for communicating with the inner sounding cavity; an outer peripheral side of the second diaphragm is fixed in the through hole, and the airflow generated by the vibration of the first diaphragm pushes the second diaphragm through the through hole of the support ring.

2. The sounding device as described in claim 1, wherein, the through hole includes a first through hole formed relatively through one side of the support ring body and a second through hole formed on an other side of the support ring body.

3. The sounding device as described in claim 1, wherein, the magnetic circuit system includes a yoke fixed on the frame, an extension part protruding from the yoke towards the second vibration system, a first auxiliary magnet fixed to the yoke for forming the second magnetic gap around the extension part, and a second auxiliary magnet fixed to the yoke and surrounding the first auxiliary magnet and spaced from the first auxiliary magnet for forming the first magnetic gap; and an outer periphery of the second diaphragm is supported by the support ring.

4. The sounding device as described in claim 3, wherein, the first diaphragm comprises a first suspension, a second suspension disposed at an inner side of the first suspension, a ring-shaped skeleton connecting the first suspension and the second suspension, and a ring-shaped first dome fixed to the skeleton; an outer peripheral side of the first suspension is fixed to the frame, and an inner peripheral side of the second suspension is fixed to a top surface of the support ring; the first voice coil is fixed on a side of the skeleton close to the magnetic circuit system; the cover body presses an inner peripheral side of the second suspension to the support ring, and the cover body and the second diaphragm are spaced apart in a vibration direction of the second diaphragm; another end of the skeleton is connected with the first voice coil for suspending the first voice coil in the first magnetic gap.

5. The sounding device as described in claim 4, wherein, the first vibration system further includes an auxiliary diaphragm fixed to the frame and the skeleton.

6. The sounding device as described in claim 4, wherein, the second diaphragm includes a second vibration part spaced from the extension part in the vibration direction, a third suspension extending outward from the periphery of the second vibration part, and a fixed part extending from an outer peripheral side of the third suspension and fixed to the support ring; the second voice coil is fixed on the side of the second vibration part close to the magnetic circuit system.

7. The sounding device as described in claim 4, wherein, the magnetic circuit system further includes a first pole plate fixed on a side of the first auxiliary magnet close to the first vibration system, and a second pole plate fixed to a side of the second auxiliary magnet close to the first vibration system.

8. The sounding device as described in claim 3, wherein, the magnetic circuit system further comprises a mounting hole penetrating the extension part and the yoke along the vibration direction of the second diaphragm.

9. The sounding device as described in claim 8, wherein, the insertion member includes an insertion member body accommodated in the mounting hole, a support wall of the insertion member that is bent and extended outward by the top end of the insertion member body, and a conductive terminal extending from the bottom end of the insertion member body to outside the inner sounding cavity; the support wall of the insertion member is fixed to a top part of the extension part, the first voice coil and the second voice coil are respectively electrically connected to the insertion member body.

10. The sounding device as described in claim 3 including a leak hole formed between the frame and the yoke, and a housing fixed on the outer peripheral side of the yoke, wherein the housing engages with the frame.

* * * * *